(12) United States Patent
Kopp et al.

(10) Patent No.: US 8,463,094 B2
(45) Date of Patent: Jun. 11, 2013

(54) CHIRAL FIBER POLARIZER

(75) Inventors: Victor Il'ich Kopp, Fair Lawn, NJ (US);
Victor M. Churikov, Wyckoff, NJ (US);
Guoyin Zhang, Clifton, NJ (US); Sheng Zhang, Hackensack, NJ (US); Jonathan Singer, New Hope, PA (US)

(73) Assignee: Chiral Photonics, Inc., Pine Brook, NJ (US)

( * ) Notice: Subject to any disclaimer, the term of this patent is extended or adjusted under 35 U.S.C. 154(b) by 0 days.

(21) Appl. No.: 12/502,717

(22) Filed: Jul. 14, 2009

(65) Prior Publication Data

US 2010/0008616 A1    Jan. 14, 2010

Related U.S. Application Data

(60) Provisional application No. 61/080,656, filed on Jul. 14, 2008.

(51) Int. Cl.
*G02B 6/26* (2006.01)
*G02B 6/42* (2006.01)

(52) U.S. Cl.
USPC .............................................. 385/43; 385/28

(58) Field of Classification Search
USPC ............................. 385/28, 43, 104
See application file for complete search history.

(56) References Cited

U.S. PATENT DOCUMENTS 4,607,912 A * 8/1986 Burns et al. ...................... 385/11
7,068,900 B2 * 6/2006 Croteau et al. .................. 385/126

OTHER PUBLICATIONS

"Synchronization of optical polarization conversion and scattering in chiral fibers," by Kopp et al, Optics Letters, vol. 31, No. 5, pp. 571-573, May 1, 2006.*
"Nonlinear polarization evolution and instability in a twisted birefringent fiber," by Matera et al, Optics Letters, vol. 11, No. 7, pp. 467-469, Jul. 1986.*
"In-line fiber polarizer," by Villarruel et al, Optical Fiber Conference, paper ME3, pp. 14-15, 1984.*
"Chiral fiber gratings: perspectives and challenges for sensing applications," by Kopp et al, Proceedings of SPIE, vol. 6619, pp. 66190B-1 through 66190B-7, Jul. 2007.*
"Low excess loss conditions of polarization maintaining fiber couplers," by Yokohama et al, Applied Optics, vol. 27, No. 23, pp. 4807-4813, Dec. 1988.*
"Analysis of mode coupling behavior in fused polarization-maintaining fiber couplers," by Yokohama et al, Applied Optics, vol. 28, No. 19, pp. 4216-4225, Dec. 1989.*

* cited by examiner

*Primary Examiner* — Ryan Lepisto
*Assistant Examiner* — Robert Tavlykaev
(74) *Attorney, Agent, or Firm* — Edward Elkin, Esq.

(57) ABSTRACT

A chiral optical fiber polarizer is provided that is capable of being fabricated in-line along a conventional polarization maintaining fiber having external structural element(s), positioned between two optical fiber portions, and includes a modified central portion with altered fiber cladding interface elements on each side thereof. The modified central portion includes at least one diameter reduced sub-section that allows a light signal to propagate simultaneously in the core and in at least one external structure element, and at least one diameter expanded sub-section that allows the light signal to propagate substantially in the core, where the modified central portion is configured to be operable to serve as a polarizer for light signals with linear polarization components.

6 Claims, 1 Drawing Sheet

US 8,463,094 B2

CHIRAL FIBER POLARIZER

CROSS REFERENCE TO RELATED APPLICATIONS

The present patent application claims priority from the commonly assigned co-pending U.S. provisional patent application 61/080,656 entitled "Chiral Fiber Polarizer", filed Jul. 14, 2008.

FIELD OF THE INVENTION

The present invention relates generally to optical fiber polarizers, and more particularly to an in-fiber chiral optical fiber polarizer that may be fabricated in-line along the fiber, by modifying a portion of a polarization maintaining fiber that is capable of being altered to have a reduced diameter non-circular cross-section.

BACKGROUND OF THE INVENTION

Any device that requires polarized light uses one or more polarizers. Polarizers have many industrial applications. For example, polarizers may be utilized in electro-optical modulators and laser subsystems. In essence, a polarizer eliminates an undesirable light component of a first polarization, and allows a desirable light component of a second polarization to pass through.

Of particular interest is the use of polarizers as in-line modules in optical fibers. Previously known in-line polarizers typically comprise an assembly with a first lens following a first optical fiber for collimating the light emerging from the fiber. The collimated light then passes though a polarizer plate and is then focused by a second lens into a second optical fiber. The main disadvantage of this type of polarizer is that it is relatively expensive and difficult to construct. Furthermore, the lens-based polarizer interrupts the optical fiber leading to optical loss and undesirable reflection. Finally, the lens-based polarizer introduces a device into the fiber that is much larger than the fiber, thereby causing potential space and size issues.

One attempt to solve the above problems was the development of another in-line fiber polarizer that was constructed by wrapping the optical fiber in several loops around a circular member before allowing the fiber to continue on its way. This arrangement eliminated some of the drawbacks of the previously known lens-based polarizer—for example, this was a true in-fiber device that did not interrupt the fiber with a much larger device. However, the coil-based polarizer suffered from another significant drawback—the coil element around which the fiber needed to be wrapped was typically many centimeters in diameter. Thus, while not as unwieldy as a lens-based polarizer, the coil-based polarizer was still very bulky and difficult or impossible to use in many applications.

A novel in-fiber polarizer, that advantageously solved all of the problems of the prior art polarizers was disclosed in a commonly assigned U.S. Pat. No. 6,721,469, issued on Apr. 13, 2004, and entitled "Chiral In-Fiber Adjustable Polarizer Apparatus and Method" (hereinafter the "Adjustable Polarizer patent"), which is hereby incorporated by reference in its entirety. That novel adjustable polarizer worked with circularly polarized light and utilized a fiber component that functioned as a quarter-wave plate to convert circular polarization into linear polarization over a relatively narrow frequency band. The fact that polarization conversion only happens across a narrow frequency band, is one of the chief limitations and drawbacks of quarter-wave plates and quarter-wave plate-type devices. In addition, since most practical applications utilize linearly polarized light (for example transmitted through standard polarization-maintaining fibers), the polarizer disclosed in the Adjustable Polarizer patent required conversion of incoming light into circularly polarized light prior to entering the polarizer.

In addition, previously known in-line polarizers must be spliced in-line with one or two optical fibers when in use resulting in various fiber coupling related issues such as insertion loss, diameter/material mismatch, etc. In addition, most previously known in-line polarizers have to be fabricated from special preforms. Finally, in-line polarizers with narrow diameter regions are typically limited in maximum power of the signal being transmitted therethrough as a result of a "leading effect"—primarily, the Stimulated Brillouin Scattering ("SBS") effect. The SBS effect is highly undesirable in typical narrow diameter polarizers, because it results in a backward propagating wave of the same linear polarization as the incident (i.e., "fundamental") wave, creating undersirable interference and limiting maximum incident signal power.

It would thus be desirable to provide an in-line polarizer that does not interrupt an optical fiber with a larger structure and that is capable of operating with an unpolarized light input. It would further be desirable to provide an in-line polarizer that does not require a preform and that can be easily fabricated to desired specifications and characteristics, by modifying a region of a particular optical fiber to enable the desired polarizer properties therein. It would also be desirable to provide an in-line polarizer that substantially minimizes or eliminates the SBS effect.

BRIEF DESCRIPTION OF THE DRAWINGS

In the drawings, wherein like reference characters denote corresponding or similar elements throughout the various figures.

SUMMARY OF THE INVENTION

Figure 1:
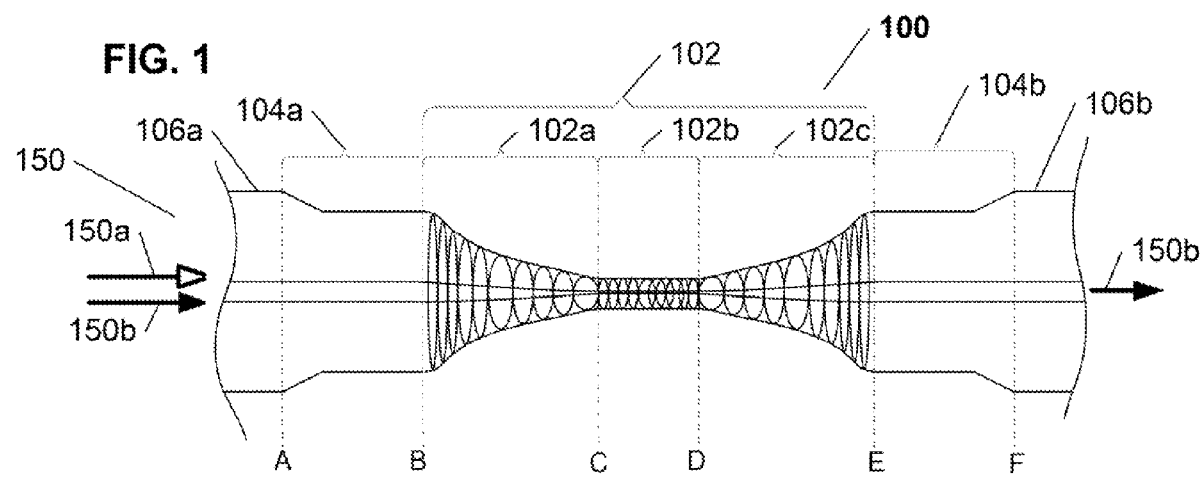
FIG. 1 shows a schematic diagram of a side view of a first exemplary embodiment of the chiral fiber polarizer of the present invention.

The present invention is directed to an inventive chiral optical fiber polarizer that is capable of being fabricated in-line along, and utilizing, a conventional polarization maintaining fiber, preferably one which includes at least one structure element that is external, and parallel, to the fiber's core. The novel chiral fiber polarizer is preferably positioned between two unmodified optical fiber portions, and includes a modified central portion, having altered fiber cladding interface elements on each side thereof. The modified central portion is preferably of a non-circular cross section, and comprises at least one diameter reduced sub-section operable to allow a light signal of said predefined operation wavelength to propagate substantially in the core and in the at least one external structure element, at least one diameter expanded sub-section operable to allow a light signal to propagate substantially in the core, each sub-section being produced in accordance with a corresponding predefined diameter reduction and expansion profile.

In accordance with the present invention, the modified central portion is further configured in accordance with at least one helical pitch profile that is operable to, upon receiving a light signal with a first and second linear polarization components: convert the first linear polarization component to a first elliptical polarization component while scattering the first elliptical polarization component, and convert the second linear polarization component to a second elliptical polarization component, transmit therethrough, and convert back to the second linear polarization component prior to exit therefrom.

Therefore, the present invention provides a novel in-line polarizer that does not interrupt an optical fiber with a larger structure and that is capable of operating with an unpolarized light input. Furthermore, the inventive polarizer does not require a preform, and can be easily fabricated to desired specifications and characteristics, by modifying a region of a particular optical fiber to enable the desired polarizer properties therein.

Additionally, because the inventive polarizer comprises a circular polarizer region, such a region can comprise a pitch profile therein selected and configured to cause sufficient circular polarization therein to substantially eliminate the occurrence of the SBS effect in response to an incident signal passing therethrough.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

DETAILED DESCRIPTION OF THE PREFERRED EMBODIMENTS

The present invention provides a novel chiral optical fiber polarizer that is advantageously capable of being fabricated, utilizing the novel methodology of the present invention, in-line along a conventional polarization maintaining fiber, preferably one which includes at least one structure element that is external, and parallel, to the fiber's core. Because the novel chiral optical fiber polarizer is fabricated by essentially modifying a region of the conventional fiber, it has a number of very significant advantages over previously known in-line polarizers—for example, in does not need to be spliced with fibers on either side, avoiding all issues associated with coupling of in-line optical devices to conventional fibers. It is also much less expensive to fabricate as there is no need for a special custom perform.

Referring now to FIG. 1, a full in-line optical chiral fiber polarizer 100 is shown. The novel chiral fiber polarizer 100 is preferably positioned between two unmodified optical fiber portions 106a and 106b, each of which is preferably a polarization maintaining fiber that is capable of being altered to have a reduced diameter non-circular cross-section (see FIGS. 2A to 2C below), and includes a modified central polarizer portion 102, with altered fiber cladding interface elements 104a, 104b on each side thereof.

Figure 2A:
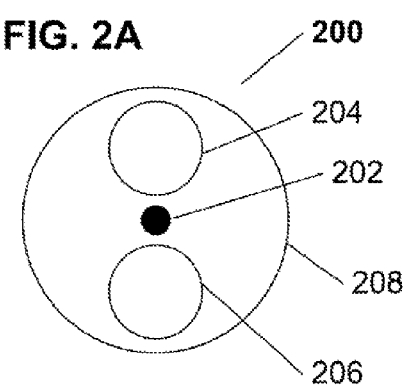
FIGS. 2A, 2B and 2C shows schematic diagrams of cross-sectional views, of different stages of modification of an optical fiber cladding necessary prior to the stage of fabrication of the chiral fiber polarizer of FIG. 1 in the modified region.
Figure 2B:
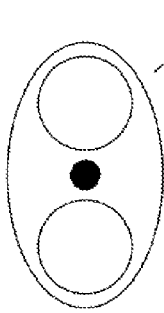
Figure 2C:
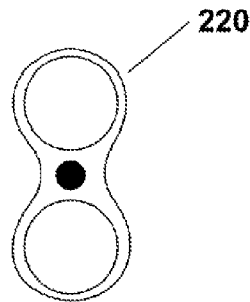

By way of example, the fiber portions of 106a, 106b may comprise regions of a conventional PANDA fiber, such as a PANDA fiber 200 of FIG. 2A, which includes a core 202, a cladding 208, and a pair of stress members 204, 206. So that the modified central polarizer portion 102 of the polarizer 100 can be readily fabricated, in one embodiment of the invention, portions of each fibers 106a, 106b are altered during fabrication (by reducing the cladding diameter and by making the fiber cross-section non-circular) to produce the interface elements 104a and 104b at each end of the modified central polarizer portion 102. Examples of different stages of the above-described alteration performed on fiber 200 of FIG. 2A, are shown in FIGS. 2B and 2C, as altered fiber portions 210, and 220, respectively. The above-noted alteration may be conducted in a number of different ways. For example, the fiber cladding can be etched in accordance with a desired etching profile.

The modified central polarizer portion 102 is of a non-circular cross section, and comprises at least one diameter reduced sub-section 102b (produced in accordance with a predefined diameter reduction profile) operable to allow a light signal of a predefined operation wavelength to propagate substantially in the core and in the at least one external structure element, and at least one (in the case of the preferred embodiment) a pair of diameter expanded sub-sections 102a and 102c (produced in accordance with a predefined diameter expansion profile) operable to allow a light signal to propagate substantially in the core.

Furthermore, the modified central polarizer portion 102 is preferably configured in accordance with at least one helical pitch profile, such that the polarizer portion 102, is operable to, upon receiving a light signal 150 with a first and second linear polarization components, 150a, 150b, respectively: in the region between B and E, convert the first linear polarization component 150a entering the polarizer portion at B to a first elliptical polarization component while scattering the first elliptical polarization component, convert the second linear polarization component 150b to a second elliptical polarization component, transmit therethrough, and convert back to the second linear 150b polarization component prior to exit therefrom at E.

The desired helical pitch profile may be determined and selected from various pitch profiles such as disclosed in column 5, line 18 of the above-incorporated "Adjustable Polarizer Patent", and/or otherwise selected and configured in accordance with the helical pitch selection and configuration techniques disclosed in the commonly assigned U.S. Pat. No. 6,839,486, entitled "Chiral Fiber Grating" of Victor Kopp et al., issued on Jan. 4, 2005, which had been incorporated by reference in its entirety in the above-incorporated "Adjustable Polarizer Patent" (in column 3 thereof), and that is hereby incorporated by reference in its entirety herein (hereinafter referred to as "Chiral Fiber Grating Patent"). Examples of helical pitch profiles that may be utilized, by way of example, in accordance with the present invention are shown in FIG. 1C of the above-incorporated "Chiral Fiber Grating Patent", and FIGS. 1 and 2 of the above-incorporated "Adjustable Polarizer Patent".

In practice, fabrication of chiral fiber structures with the desired helical pitch profile, may be accomplished by a variety of chiral fiber device fabrication techniques disclosed in various commonly assigned issued U.S. Patents, and U.S. Patent Applications incorporated by reference in their entirety into the above-incorporated "Adjustable Polarizer Patent" such as, for example chiral fiber device fabrication techniques disclosed in the commonly assigned U.S. patent application Ser. No. 10/099,623 entitled "Apparatus and Method for Fabricating Chiral Fiber Gratings", filed on Mar. 14, 2002, which had been incorporated by reference in its entirety in the above-incorporated "Adjustable Polarizer Patent" (in column 4 thereof), and that is hereby incorporated by reference in its entirety herein (hereinafter referred to as "Chiral Fiber Grating Fabrication Patent").

In one embodiment of the invention, the modified central polarizer portion 102 comprises a helical pitch profile selected and configured to cause a sufficient circular polarization effect for signals passing therethrough, to substantially eliminate the occurrence of the SBS effect in response to an incident signal passing therethrough. This is because in a circular polarizer, a reverse propagating wave is of circular polarization of opposite handedness to that of the incident wave, and because the modified central polarizer portion 102, having the properly configured helical pitch profile, scatters propagating waves having circular polarization of an opposite handedness to that of the incident wave, advantageously, this embodiment of the present invention actually substantially prevents the undesirable reverse propagating wave, associated with the SBS effect, from ever forming.

Figure 3:
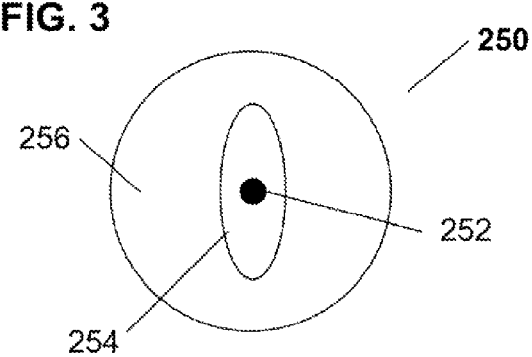
FIG. 3 shows a schematic diagram of a cross-sectional view of an optical fiber perform that may be used to fabricate the chiral fiber polarizer of FIG. 1.

It should be noted that other polarization maintaining fibers can readily be used in accordance with the present invention as long as there is at least one structure element is provided external, and parallel to the core, and as long as the polarization maintaining fiber is capable of being altered to have a reduced diameter non-circular cross-section. For example, referring now to FIG. 3, an optical fiber 250 is shown and includes a core 252, an elliptical cross-section stress member surrounding the core, and a cladding 256.

Thus, while there have been shown and described and pointed out fundamental novel features of the invention as applied to preferred embodiments thereof, it will be understood that various omissions and substitutions and changes in the form and details of the devices and methods illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

We claim:

1. An optical chiral fiber polarizer comprising:
an optical fiber structure comprising a core, and at least one structure element positioned external and parallel to the core, said optical fiber structure further comprising:
at least one modified portion comprising a non-circular exterior cross section, each said at least one modified portion being configured in accordance with at least one predefined diameter reduction and expansion profile to produce at least one diameter expansion sub-section, and at least one diameter reduction sub-section, wherein each said at least one diameter expanded sub-section is operable to allow a light signal of a predefined operation wavelength and comprising first and second linear polarization components, to propagate substantially in said core, and wherein each said at least one diameter reduced sub-section is operable to allow both said first and said second polarization components of said light signal of said predefined operation wavelength to simultaneously propagate substantially in said core and in said at least one external structure element, and wherein each said at least one modified portion is further configured in accordance with at least one helical pitch profile, such that each said at least one modified portion is operable to, in response to receiving, said light signal for processing:
convert said first linear polarization component to a first elliptical polarization component while scattering said first elliptical polarization component, and
convert said second linear polarization component to a second elliptical polarization component, transmit therethrough, and convert back to said second linear polarization component prior to exit therefrom.

2. The optical chiral fiber polarizer of claim 1, wherein said least one external structure element comprises at least one of: a cladding, and a stress member.

3. The optical chiral fiber polarizer of claim 1, wherein said least one external structure element comprises a cladding surrounding said core.

4. The optical chiral fiber polarizer of claim 3, wherein said least one external structure element further comprises a pair of parallel longitudinally disposed stress members positioned within said cladding, being parallel to said core and in the same plane therewith, wherein said core is disposed proximal to, and between said pair of stress members.

5. The optical chiral fiber polarizer of claim 1, wherein said at least one helical pitch profile is selected and configured to cause sufficient circular polarization effect in said at least one modified portion, to substantially eliminate the occurrence of a Stimulated Brillouin Scattering effect for any incident light signal passing therethrough.

6. The optical chiral fiber polarizer of claim 1, wherein said at least one modified portion is formed along a predetermined region of a conventional polarization maintaining fiber that is operable to be altered to comprise a reduced diameter non-circular cross-section.

* * * * *